US012606057B2

(12) United States Patent
Shin et al.

(10) Patent No.: US 12,606,057 B2
(45) Date of Patent: Apr. 21, 2026

(54) REAR FACING SEAT MOUNTING PARTITION STRUCTURE

(71) Applicants: Hyundai Motor Company, Seoul (KR); Kia Corporation, Seoul (KR)

(72) Inventors: Joonghyun Shin, Hwaseong-si (KR); Won Ki Song, Seongnam-si (KR); Heedae Oh, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 499 days.

(21) Appl. No.: 18/295,936

(22) Filed: Apr. 5, 2023

(65) Prior Publication Data

US 2024/0017641 A1 Jan. 18, 2024

(30) Foreign Application Priority Data

Jul. 15, 2022 (KR) ........................ 10-2022-0087485

(51) Int. Cl.
B60N 2/01 (2006.01)
B60R 22/34 (2006.01)
(52) U.S. Cl.
CPC .............. B60N 2/012 (2013.01); B60R 22/34 (2013.01); *B60R 2022/3402* (2013.01)

(58) Field of Classification Search
CPC ........ B60N 2/688; B60N 2/012; B60R 21/026
See application file for complete search history.

(56) References Cited

U.S. PATENT DOCUMENTS

| | | | | | |
|---|---|---|---|---|---|
| 1,923,466 | A | * | 8/1933 | West | B60N 2/01 |
| | | | | | 296/63 |
| 2018/0361984 | A1* | | 12/2018 | Lin | B60R 22/20 |
| 2022/0126773 | A1* | | 4/2022 | Yagi | B60N 2/686 |
| 2022/0402557 | A1* | | 12/2022 | Hara | B60N 2/01 |

* cited by examiner

*Primary Examiner* — Caroline N Butcher
(74) *Attorney, Agent, or Firm* — Slater Matsil, LLP

(57) ABSTRACT

In one aspect, a rear facing seat mounting partition structure includes a partition assembly configured to mount a rear facing seat that is disposed toward a rear of a vehicle body, the partition assembly including a partition outer portion connected to a center pillar portion of the vehicle body, a partition lower portion configured to be connected to a floor portion of the vehicle body, and a partition inner portion. The structure further includes a pole assembly configured to be mounted on a roof portion of the vehicle body and the floor portion of the vehicle body and configured to support the partition inner portion of the partition assembly and a partition side assembly connected to the pole assembly and the floor portion of the vehicle body.

20 Claims, 10 Drawing Sheets

<u>10</u>

Front         22    30    25   26       Rear

24

REAR FACING SEAT MOUNTING PARTITION STRUCTURE

CROSS-REFERENCE TO RELATED APPLICATIONS

This application claims the benefit of Korean Patent Application No. 10-2022-0087485, filed on Jul. 15, 2022, which application is hereby incorporated herein by reference.

TECHNICAL FIELD

The present invention relates to a rear facing seat mounting partition structure.

BACKGROUND

The general vehicle seat is disposed toward the front of the vehicle body, but the rear-facing seat disposed toward the rear of the vehicle body for convenience or space utilization of the occupant may also be disposed.

The general vehicle's rear-facing seat may be disposed in front of the vehicle and has the merit of being easy to respond to safety tests such as seat belt anchors.

However, particularly in the case of a vehicle for hailing, there is a need to increase space utilization and protect privacy by mounting the rear-facing seat on a partition panel that separates the driver and the occupant seat.

The above information disclosed in this background section is only for enhancement of understanding of the background of embodiments of the invention, and therefore it may contain information that does not form the prior art that is already known to a person of ordinary skill in the art.

SUMMARY

The present invention relates to a rear facing seat mounting partition structure. Particular embodiments relate to a rear facing seat mounting partition structure that may improve center pillar connection strength.

Embodiments of the present invention provide a rear facing seat mounting partition structure that increases space utilization and protects privacy by mounting the rear facing seat on a partition panel separating the driver and occupant seats.

A rear facing seat mounting partition structure according to an exemplary embodiment of the present invention may include a partition assembly including a partition outer portion connected to a center pillar portion of a vehicle body and a partition lower portion connected to a floor portion, wherein a rear facing seat disposed toward the rear of the vehicle body is mounted to the partition assembly. A pole assembly is mounted on a roof portion and the floor portion of the vehicle body to support a partition inner portion of the partition assembly, and a partition side assembly is connected to the pole assembly and the floor portion.

The partition assembly may include a partition body member connected to the center pillar portion and the floor portion and a partition upper member mounted on the upper portion of the partition body member.

The rear facing seat mounting partition structure according to an exemplary embodiment of the present invention may further include a D-ring connecting bracket mounted to the partition upper member.

The rear facing seat mounting partition structure according to an exemplary embodiment of the present invention may further include a lower anchor mounting bracket mounted to the partition body member.

The partition assembly may further include a partition body column that protrudes toward the front of the vehicle body and is disposed in the height direction of the vehicle body.

The rear facing seat mounting partition structure according to an exemplary embodiment of the present invention may further include a lower anchor support portion supporting the partition assembly and supporting the front of the floor portion.

The lower anchor mounting bracket may be connected to a position corresponding to the mount position of the partition body column, and the lower anchor support portion may connect a predetermined position of the partition body column positioned above the mount position of the lower anchor mounting bracket and the floor portion.

The partition assembly may further include a partition body column that protrudes toward the front of the vehicle body and is disposed in the height direction of the vehicle body, and the rear facing seat mounting partition structure may further include a seat belt retractor mounted on the partition body column.

The partition body column may further include a protruded formed retractor mounting portion, and the seat belt retractor may be mounted to the retractor mounting portion through retractor brackets.

The rear facing seat may include an outer seat mounted adjacent to a side of the vehicle body and an inner seat mounted adjacent to the outer seat toward a center of the vehicle body, and the rear facing seat mounting partition structure may further include an outer seat lower anchor mounting bracket and an inner seat lower anchor mounting bracket mounted to the partition body member.

The rear facing seat mounting partition structure according to an exemplary embodiment of the present invention may further include an outer belt buckle mounted to the inner seat lower anchor mounting bracket.

The rear facing seat mounting partition structure according to an exemplary embodiment of the present invention may further include an inner belt buckle mounted to the pole assembly.

The partition side assembly may include a partition side frame member that is inclinedly disposed to connect the pole assembly and the floor portion and a partition side panel connecting the pole assembly and the partition frame member.

According to the rear facing seat mounting partition structure according to an exemplary embodiment of the present invention, space utilization can be increased by mounting the rear facing seat on a partition panel that divides the driver and occupant seats.

In addition, according to the rear facing seat mounting partition structure according to an exemplary embodiment of the present invention, it is possible to secure the strength of a configuration supporting the seat, so that the occupant can be protected in the event of a vehicle collision.

In addition, the effects that can be obtained or predicted due to the embodiments of the present invention will be directly or implicitly disclosed in the detailed description of the embodiments of the present invention. That is, various effects expected according to embodiments of the present invention will be disclosed within the detailed description to be described later.

BRIEF DESCRIPTION OF THE DRAWINGS

Since these drawings are for reference in describing exemplary embodiments of the present invention, the technical spirit of the present invention should not be construed as being limited to the accompanying drawings.

Figure 1:
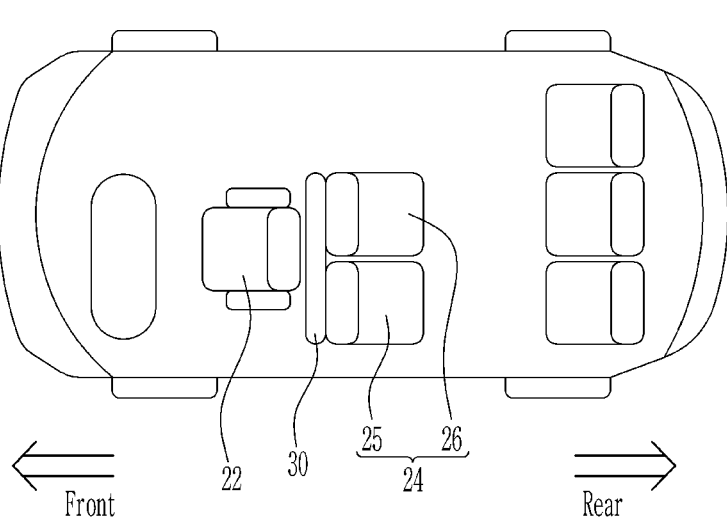
FIG. 1 is a top plan view of a vehicle body to which a rear facing seat mounting partition structure according to an exemplary embodiment of the present invention may be applied.

The following reference identifiers may be used in connection with the accompanying drawings to describe exemplary embodiments of the present disclosure.

| | |
|---|---|
| 10: vehicle body | 12: center pillar portion |
| 14: center pillar mounting bracket | 16: floor portion |
| 18: roof portion | 19: roof cross member |
| 20: roof bracket | 22: driver's seat |
| 24: rear facing seat | 25: outer seat |
| 26: inner seat | 30: partition assembly |
| 32: partition outer portion | 34: partition lower portion |
| 36: partition inner portion | 38: partition body member |
| 40: partition upper member | 50: partition body column |
| 52: retractor mounting portion | 54: lower anchor support portion |
| 60: pole assembly | 70: partition side assembly |
| 72: partition side frame member | |
| 74: partition side frame panel | |
| 76: partition side engaging portion | 90: D-ring connecting bracket |
| 92: D-ring | 93: D-ring connecting bolt |
| 100: lower anchor mounting bracket | |
| 102: outer seat lower anchor mounting bracket | |
| 103: lower anchor connecting bolt | |
| 104: inner seat lower anchor mounting bracket | |
| 106: lower anchor | 110: seat belt retractor |
| 112, 113: retractor bracket | 120: outer belt buckle |
| 121: belt buckle connecting bolt | 122: inner belt buckle |
| 130: belt | |
| 140: partition side frame bracket | |

DETAILED DESCRIPTION OF ILLUSTRATIVE EMBODIMENTS

Embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly describe embodiments of the present invention, parts irrelevant to the description are omitted, and the same reference numerals are assigned to the same or similar elements throughout the specification.

Since the size and thickness of each component shown in the drawings are arbitrarily indicated for convenience of explanation, the present invention is not necessarily limited to the one shown in the drawing, and the thickness is enlarged to clearly express various parts and areas.

In addition, in the following detailed description, the names of the components are divided into first, second, and the like to distinguish them in the same relationship, and the order is not necessarily limited in the following description.

Throughout the specification, when a part includes a certain component, it means that other components may be further included, rather than excluding other components, unless otherwise stated.

In addition, terms such as "portion" described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

Exemplary embodiments of the present invention will hereinafter be described in detail with reference to the accompanying drawings.

FIG. 1 is a top plan view of a vehicle body to which a rear facing seat mounting partition structure according to an exemplary embodiment of the present invention may be applied.

Referring to FIG. 1, a vehicle body 10 to which a rear facing seat mounting partition structure according to an exemplary embodiment of the present invention may be applied may include a front seat 22 disposed toward the front of the vehicle body 10 and a rear facing seat 24 disposed toward the rear of the vehicle body 10.

For example, the front seat 22 may be a driver's seat, but is not limited thereto.

A partition assembly 30 may be mounted between the front seat 22 and the rear facing seat 24.

In the vehicle body 10 to which the rear facing seat mounting partition structure according to an exemplary embodiment of the present invention may be applied, the front seat 22 and the rear facing seat 24 are disposed adjacently to increase the space utilization inside the vehicle, and the partition assembly 30 may be mounted between the front seat 22 and the rear facing seat 24 to protect the privacy of the occupant.

As shown in the drawing, the partition assembly 30 may be installed only in a part of the width direction of the vehicle body 10.

That is, it is mounted on the rear of the front seat 22 only in a part of the width direction of the vehicle body 10 to allow the occupant to approach the space in front of the vehicle without covering the passenger seat not shown.

Figure 2:
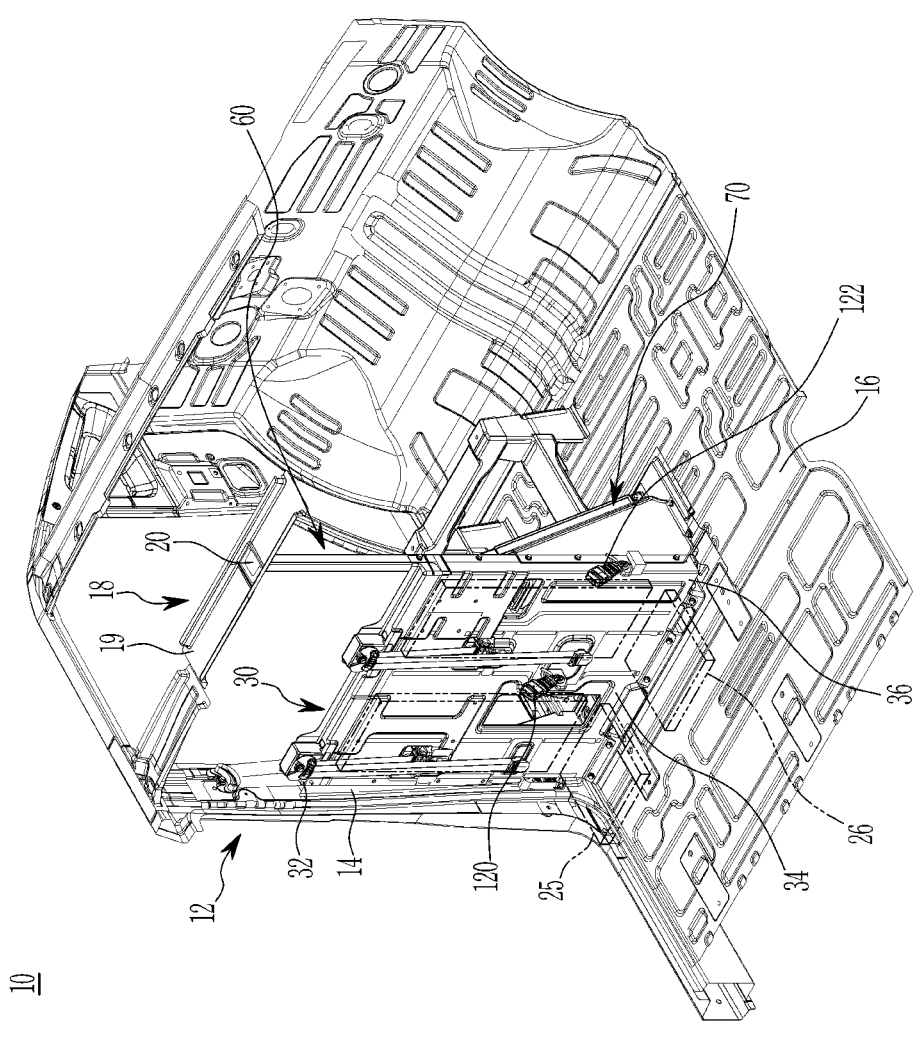
FIG. 2 is a partial perspective view of the vehicle body to which the rear facing seat mounting partition structure according to an exemplary embodiment of the present invention may be applied.
Figure 3:
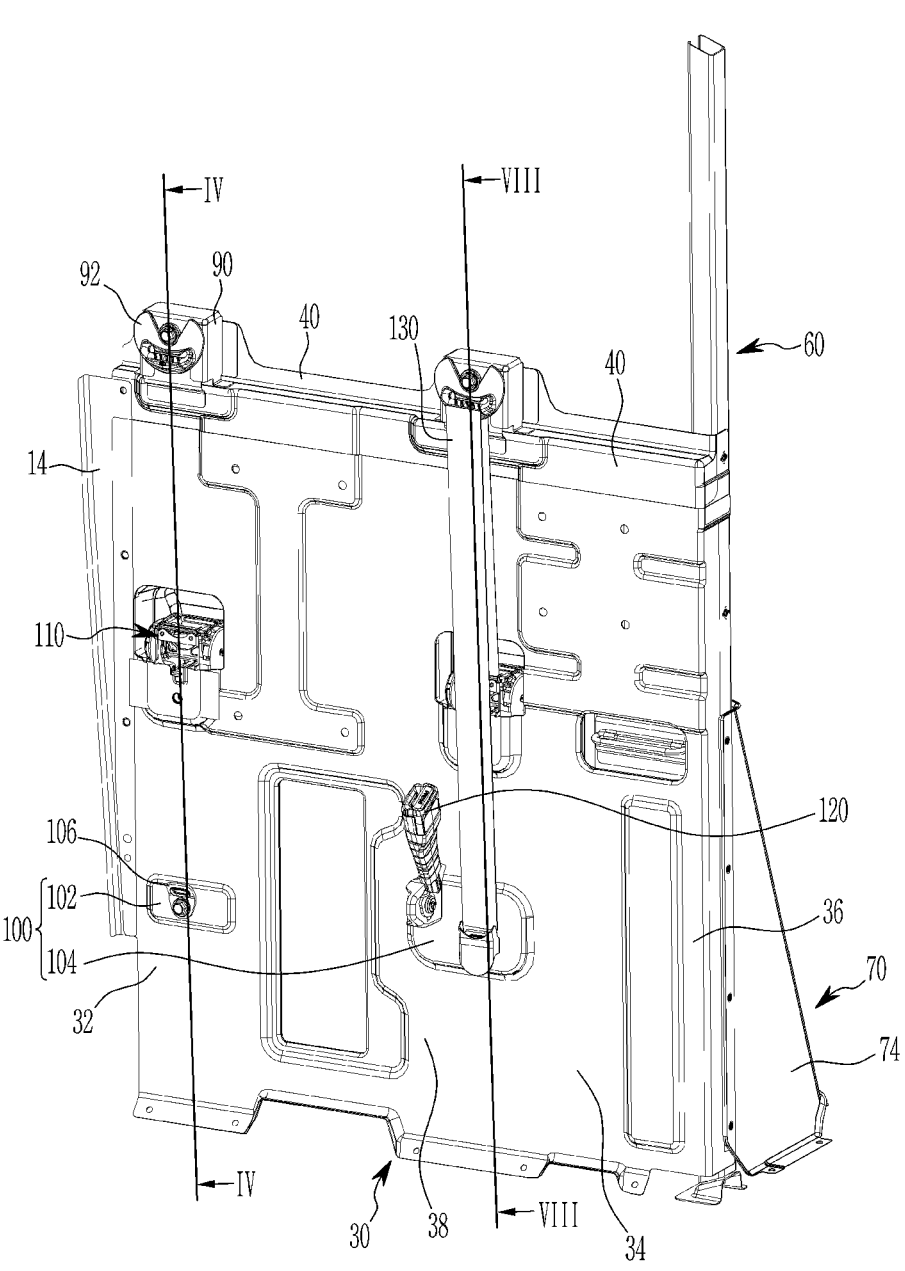
FIG. 3 is a partial perspective view of the rear direction of the rear facing seat mounting partition structure according to an exemplary embodiment of the present invention.

FIG. 2 is a partial perspective view of the vehicle body to which the rear facing seat mounting partition structure according to an exemplary embodiment of the present invention may be applied, and FIG. 3 is a partial perspective view of the rear direction of the rear facing seat mounting partition structure according to an exemplary embodiment of the present invention.

Referring to FIG. 1 to FIG. 3, the partition assembly 30 may include a partition outer portion 32 connected with a center pillar portion 12 of the vehicle body 10 and a partition lower portion 34 connected with a floor portion 16.

The partition outer portion 32 refers to a portion facing the outside of the vehicle body 10 of the partition assembly 30, and the partition lower portion 34 refers to a lower portion of the partition assembly 30.

The center pillar portion 12 may be, for example, a B pillar, but is not limited thereto.

A center pillar mounting bracket 14 is connected to the center pillar portion 12 to mount the partition outer portion 32 to the center pillar portion 12.

The partition assembly 30 may be connected to the center pillar portion 12 and the floor portion 16 to be more securely mounted to the vehicle body 10.

The rear facing seat 24 may be mounted on the partition assembly 30, and the partition assembly 30 may connect with the center pillar portion 12 and the floor portion 16 to stably support the rear facing seat 24.

The rear facing seat 24 may be bolted to the partition assembly 30, but is not limited thereto.

The rear facing seat mounting partition structure according to an exemplary embodiment of the present invention may include a pole assembly 60 mounted on a roof portion 18 and the floor portion 16 of the vehicle body 10 to support a partition inner portion 36 of the partition assembly 30 and a partition side assembly 70 connected with the pole assembly 60 and the floor portion 16.

The partition inner portion 36 means a portion facing the inside of the vehicle body 10 of the partition assembly 30. And the pole assembly 60 may be connected to the partition inner portion 36, the roof portion 18, and the floor portion 16 to firmly support the partition assembly 30.

In addition, the partition side assembly 70 may be connected to the pole assembly 60 and the floor portion 16 to firmly support the partition assembly 30.

The partition side assembly 70 may be disposed in the front-rear direction of the vehicle body 10 and may support a load of the partition assembly 30, for example, a load of the vehicle body 10 in the front-rear direction.

The roof portion 18 may include a roof cross member 19 disposed on the upper portion of the vehicle body 10 in the width direction and a roof bracket 20 connecting the roof cross member 19 and the pole assembly 60.

The partition assembly 30 may include a partition body member 38 connecting with the center pillar portion 12 and the floor portion 16 and a partition upper member 40 mounted on the upper portion of the partition body member 38.

Figure 4:
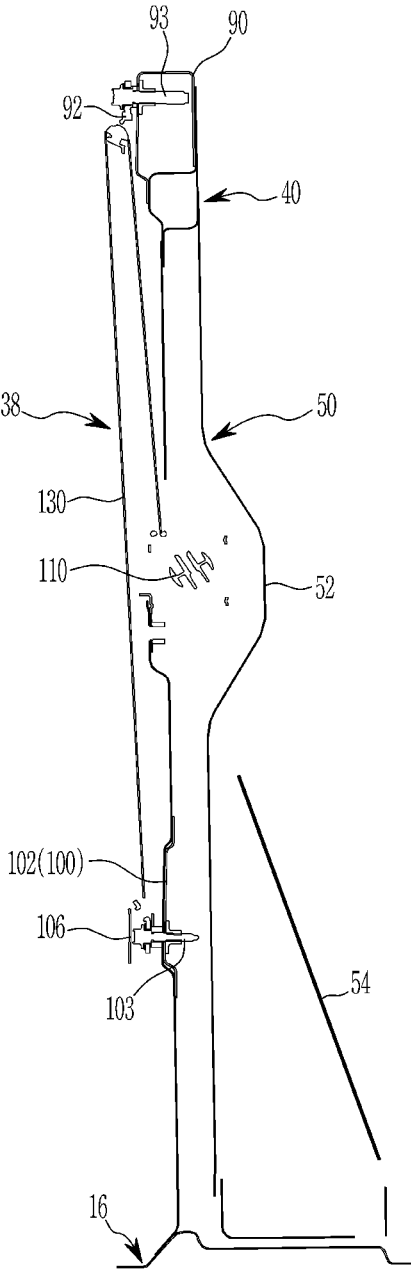
FIG. 4 is a cross-sectional view along the IV-IV line of FIG. 3.
Figure 5:
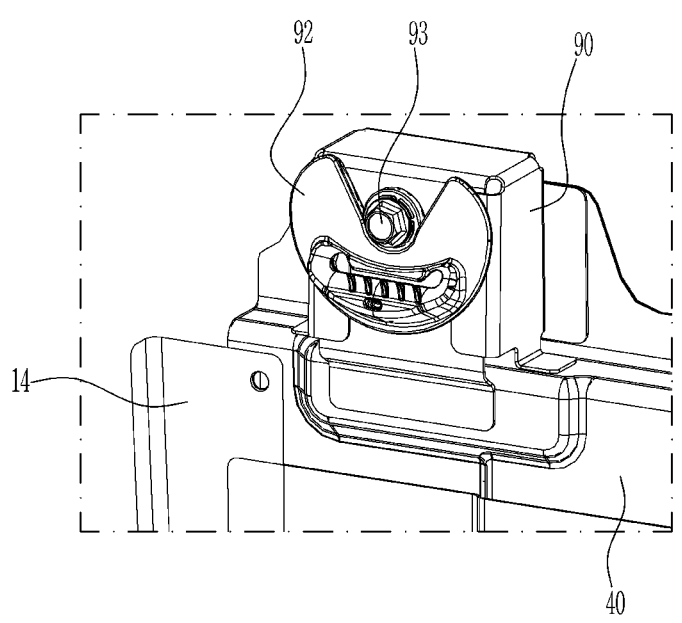
FIG. 5 is a perspective view illustrating the mount of a D-ring connecting bracket that may be applied to the rear facing seat mounting partition structure according to an exemplary embodiment of the present invention.

FIG. 4 is a cross-sectional view along the IV-IV line of FIG. 3, and FIG. 5 is a perspective view illustrating the mount of a D-ring connecting bracket that may be applied to the rear facing seat mounting partition structure according to an exemplary embodiment of the present invention.

Referring to FIG. 3 to FIG. 5, the rear facing seat mounting partition structure according to an exemplary embodiment of the present invention may further include a D-ring connecting bracket 90 mounted to the partition upper member 40.

A D-ring 92 supporting a belt 130 may be mounted to the D-ring connecting bracket 90 through a D-ring connecting bolt 93.

The D-ring connecting bracket 90 may have an approximately rectangular cross-section shape along the width direction of the vehicle body 10 as shown in the drawing, and through this, the D-ring 92 may be firmly supported, but it is not limited thereto, and the D-ring connecting bracket 90 of various shapes may be applied.

The rear facing seat mounting partition structure according to an exemplary embodiment of the present invention may further include a lower anchor mounting bracket 100 mounted to the partition body member 38.

The lower anchor 106 supporting the belt 130 may be connected to the lower anchor mounting bracket 100 by a lower anchor connecting bolt 103.

Figure 6:
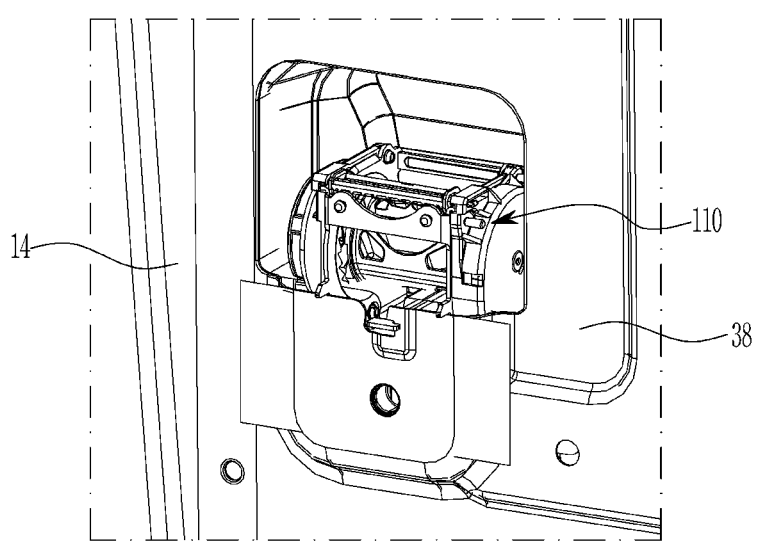
FIG. 6 and FIG. 7 are perspective views illustrating the mount of a seat belt retractor that may be applied to the rear facing seat mounting partition structure according to an exemplary embodiment of the present invention.
Figure 7:
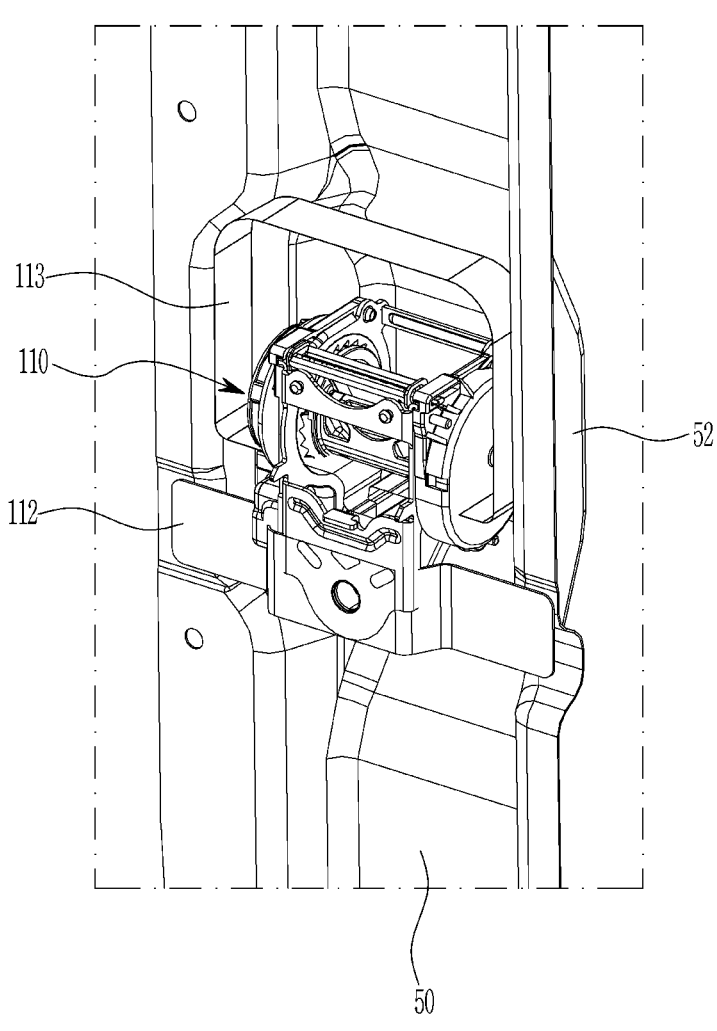

FIG. 6 and FIG. 7 are perspective views illustrating the mount of a seat belt retractor that may be applied to the rear facing seat mounting partition structure according to an exemplary embodiment of the present invention.

Figure 8:
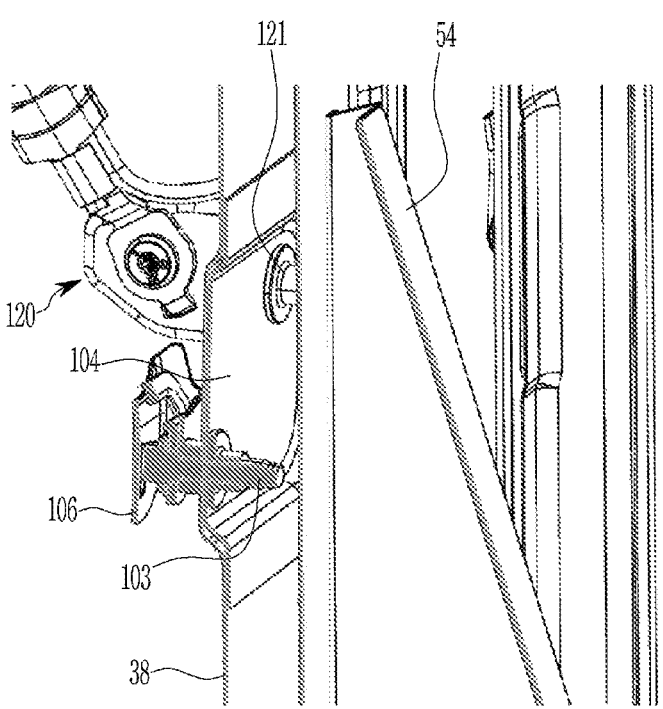
FIG. 8 is a cross-section perspective view along line VIII-VIII of FIG. 3.
Figure 9:
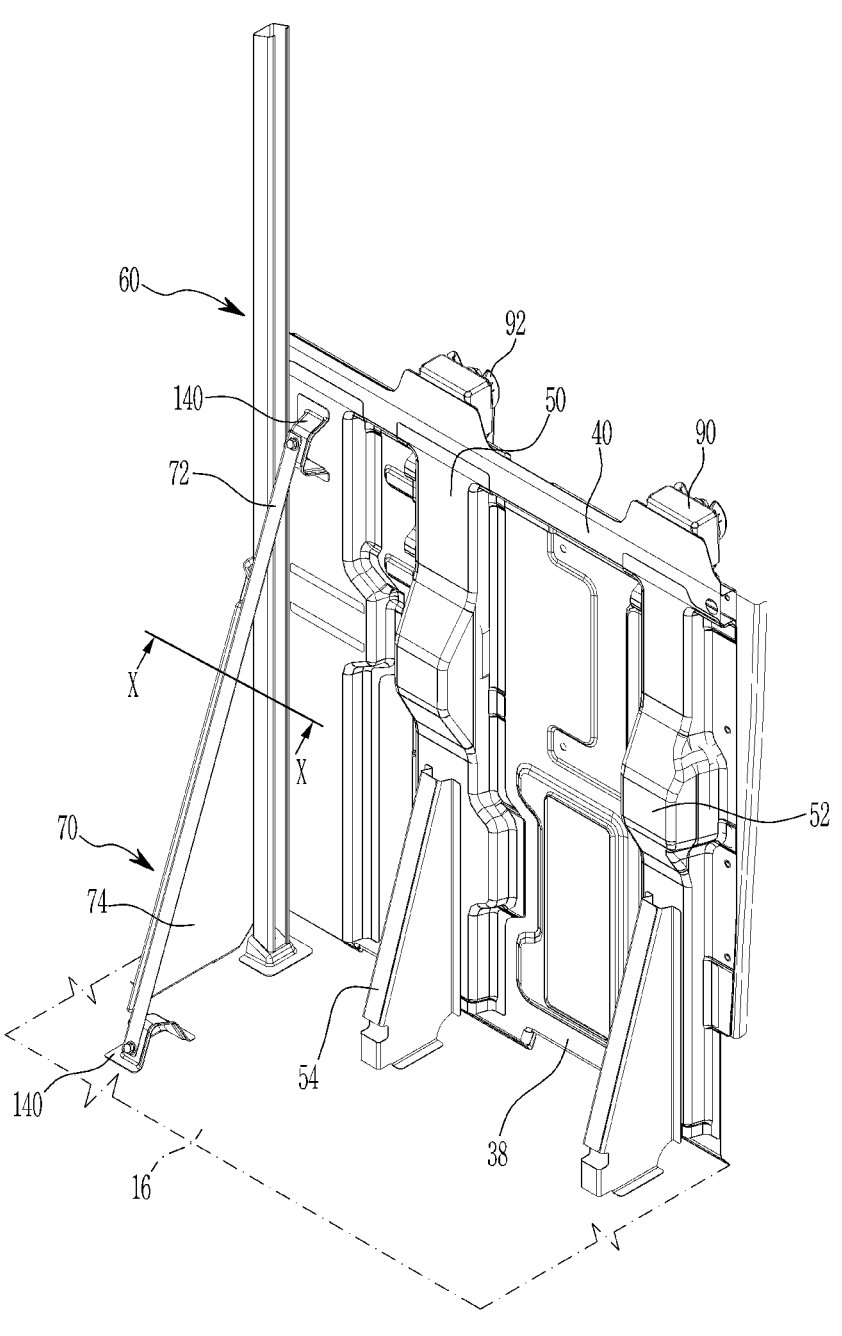
FIG. 9 is a partial perspective drawing viewed from the front direction of the rear facing seat mounting partition structure according to an exemplary embodiment of the present invention.

FIG. 8 is a cross-section perspective view along line VIII-VIII of FIG. 3, and FIG. 9 is a partial perspective drawing viewed from the front direction of the rear facing seat mounting partition structure according to an exemplary embodiment of the present invention.

The partition assembly 30 may further include a partition body column 50 that protrudes toward the front of the vehicle body 10 and is disposed in the height direction of the vehicle body 10.

As shown in FIG. 9, the partition body column 50 may increase the strength of the partition assembly 30 with a protruded curved shape.

As shown in FIG. 8 and FIG. 9, the rear facing seat mounting partition structure according to an exemplary embodiment of the present invention may further include a lower anchor support portion 54 supporting the partition assembly 30 and supporting the front of the floor portion 16.

Although the drawing shows that two of the lower anchor support portions 54 are mounted, it is not limited thereto, and the number of mounts and the mount spacing may be set in consideration of the spacing with the front seat 22.

Referring to FIG. 4, the lower anchor mounting bracket 100 is connected to a position corresponding to the mount position of the partition body column 50, and the lower anchor support portion 54 may connect a predetermined position of the partition body column 50 positioned above the mount position of the lower anchor mounting bracket 100 and the floor portion 16.

When the occupant is on board, the load may be concentrated on the D-ring 92 and the lower anchor 106 supporting the belt 130, and the load direction is particularly concentrated in the length direction of the vehicle body 10 during vehicle driving or collision.

The lower anchor support portion 54 may be connected to the front of the floor portion 16 in the partition assembly 30 to support the load of the D-ring 92 and the lower anchor 106.

Particularly, the lower anchor mounting bracket 100 is connected to a position corresponding to the position of the lower anchor support portion 54 so that the lower anchor support portion 54 may distribute the load of the lower anchor 106.

The rear facing seat mounting partition structure according to an exemplary embodiment of the present invention may further include a seat belt retractor no mounted on the partition body column 50.

Referring to FIG. 4, FIG. 6, and FIG. 7, the partition body column 50 may further include a protruded formed retractor mounting portion 52, and the seat belt retractor no may be mounted to the retractor mounting portion 52 through retractor brackets 112 and 113.

For example, the seat belt retractor no is mounted on the partition body column 50 by a width direction retractor bracket 112 disposed in the width direction of the vehicle body 10 and an inner retractor bracket 113 mounted on a concave shape of the retractor mounting portion 52.

As shown in FIG. 1, the rear facing seat may include an outer seat 25 mounted adjacent to a side of the vehicle body 10 and an inner seat 26 mounted adjacent to the outer seat toward a center of the vehicle body 10.

In other words, it is possible to increase space utilization and protect privacy by mounting two rear facing seats on the rear of the front seat 22.

As shown in FIG. 3, the lower anchor mounting bracket wo may further include an outer seat lower anchor mounting bracket 102 and an inner seat lower anchor mounting bracket 104 mounted to the partition body member 38.

The outer seat lower anchor mounting bracket 102 mounts the lower anchor 106 for the occupant seated on the outer seat 25, and the inner seat lower anchor mounting bracket 104 mounts the lower anchor 106 for the occupant seated on the inner seat 26.

Referring to FIG. 2, the rear facing seat mounting partition structure according to an exemplary embodiment of the present invention may further include an inner belt buckle 122 mounted to the pole assembly 60.

The belt 130 worn by the occupant seated on the inner seat 26 may be connected to the inner belt buckle 122.

Referring to FIG. 2, FIG. 3, and FIG. 8, the rear facing seat mounting partition structure according to an exemplary embodiment of the present invention may further include an outer belt buckle 120 mounted to the inner seat lower anchor mounting bracket 104.

The belt 130 worn by the occupant seated on the outer seat 25 may be connected to the outer belt buckle 120.

The lower anchor 106 for the occupant seated on the inner seat 26 and the outer belt buckle 120 are mounted on the inner seat lower anchor mounting bracket 104 to reduce the number of parts, and the outer belt buckle 120 and the lower anchor 106 may be securely mounted.

As shown in FIG. 8, the outer belt buckle 120 and the lower anchor 106 may be mounted to the inner seat lower anchor mounting bracket 104 by a belt buckle connecting bolt 121 and a lower anchor connecting bolt 103, respectively.

Figure 10:
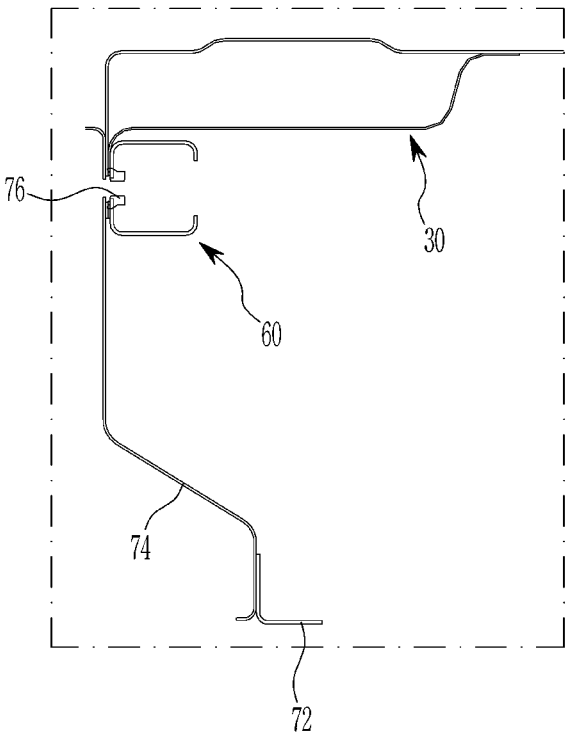
FIG. 10 is a cross-sectional view along the X-X line of FIG. 9.

FIG. 10 is a cross-sectional view along the X-X line of FIG. 9.

Referring to FIG. 9 and FIG. 10, the partition side assembly 70 may include a partition side frame member 72 that is inclinedly disposed to connect the pole assembly 60 and the floor portion 16 and a partition side frame panel 74 connecting the pole assembly 60 and the partition side frame member 72.

The partition side frame member 72 may be connected to the partition assembly 30 and the floor portion 16 through partition side frame brackets 140, respectively. The pole assembly 60 and the partition side frame panel 74 may be connected by a partition side engaging portion 76. For example, the partition side engaging portion 76 may be a weld nut for bolting engagement.

The partition side frame panel 74 is bolted engaged with the pole assembly 60 to support the partition assembly 30 more firmly.

As described above, according to the rear facing seat mounting partition structure according to an exemplary embodiment of the present invention, space utilization can be increased by mounting the rear facing seat on a partition panel separating the driver and the occupant seat.

In addition, according to the rear facing seat mounting partition structure according to an exemplary embodiment of the present invention, it is possible to secure the strength of the configuration to support the seat, and it is possible to protect the occupant in the event of a vehicle collision.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A rear facing seat mounting partition structure, the structure comprising:
   a partition assembly configured to mount a rear facing seat that is disposed toward a rear of a vehicle body, the partition assembly comprising:
      a partition outer portion configured to be connected to a center pillar portion of the vehicle body;
      a partition lower portion configured to be connected to a floor portion of the vehicle body;
      a partition inner portion; and
      a partition body column configured to protrude toward a front of the vehicle body and to be disposed in a height direction of the vehicle body;
   a pole assembly configured to be mounted on a roof portion of the vehicle body and the floor portion of the vehicle body and configured to support the partition inner portion of the partition assembly; and
   a partition side assembly configured to be connected to the pole assembly and the floor portion of the vehicle body.

2. The structure of claim 1, wherein the partition assembly further comprises:
   a partition body member configured to be connected to the center pillar portion and the floor portion of the vehicle body; and
   a partition upper member mounted on an upper portion of the partition body member.

3. The structure of claim 2, further comprising a D-ring connecting bracket mounted to the partition upper member.

4. The structure of claim 2, further comprising a lower anchor mounting bracket mounted to the partition body member.

5. The structure of claim 4, further comprising a lower anchor support portion configured to support the partition assembly and to support a front of the floor portion.

6. The structure of claim 5, wherein:
   the lower anchor mounting bracket is connected to a position corresponding to a mount position of the partition body column; and
   the lower anchor support portion connects a predetermined position of the partition body column positioned above the mount position of the lower anchor mounting bracket and the floor portion.

7. The structure of claim 1, further comprising a seat belt retractor mounted on the partition body column.

8. The structure of claim 7, wherein the partition body column further comprises a protruded retractor mounting portion, and wherein the seat belt retractor is mounted to the retractor mounting portion through retractor brackets.

9. The structure of claim 1, wherein the partition side assembly comprises:

a partition side frame member that is inclinedly disposed to connect the pole assembly and the floor portion; and a partition side frame panel connecting the pole assembly and the partition side frame member.

10. The structure of claim 1, wherein the partition assembly further comprises a partition body member configured to be connected to the center pillar portion and the floor portion of the vehicle body.

11. A rear facing seat mounting partition structure, the structure comprising:

a partition assembly configured to mount a rear facing seat that is disposed toward a rear of a vehicle body, the rear facing seat comprising an outer seat configured to be mounted adjacent to a side of the vehicle body and an inner seat configured to be mounted adjacent to the outer seat toward a center of the vehicle body, the partition assembly comprising:

a partition outer portion configured to be connected to a center pillar portion of the vehicle body;

a partition lower portion configured to be connected to a floor portion of the vehicle body; and a partition inner portion;

a partition body member configured to be connected to the center pillar portion and the floor portion of the vehicle body;

a partition upper member mounted on an upper portion of the partition body member; and a partition body column configured to protrude toward a front of the vehicle body and to be disposed in a height direction of the vehicle body;

a pole assembly configured to be mounted on a roof portion of the vehicle body and the floor portion of the vehicle body and configured to support the partition inner portion of the partition assembly; and a partition side assembly configured to be connected to the pole assembly and the floor portion of the vehicle body.

12. The structure of claim 11, wherein the structure further comprises an outer seat lower anchor mounting bracket and an inner seat lower anchor mounting bracket each mounted to the partition body member.

13. The structure of claim 12, further comprising an outer belt buckle mounted to the inner seat lower anchor mounting bracket.

14. The structure of claim 12, further comprising an inner belt buckle mounted to the pole assembly.

15. A vehicle comprising:

a vehicle body comprising a center pillar portion, a floor portion, and a roof portion;

a partition assembly comprising:

a partition outer portion connected to the center pillar portion of the vehicle body;

a partition lower portion connected to the floor portion of the vehicle body; and a partition inner portion;

a partition body member connected to the center pillar portion and the floor portion of the vehicle body;

a partition upper member mounted on an upper portion of the partition body member; and a partition body column configured to protrude toward a front of the vehicle body and to be disposed in a height direction of the vehicle body;

a rear facing seat facing a rear of the vehicle body and mounted to the partition assembly;

a pole assembly mounted on the roof portion of the vehicle body and the floor portion of the vehicle body and configured to support the partition inner portion of the partition assembly; and a partition side assembly connected to the pole assembly and the floor portion of the vehicle body.

16. The vehicle of claim 15, further comprising a D-ring connecting bracket mounted to the partition upper member.

17. The vehicle of claim 15, further comprising a lower anchor mounting bracket mounted to the partition body member.

18. The vehicle of claim 17, further comprising:

a lower anchor support portion configured to support the partition assembly and to support a front of the floor portion of the vehicle body, wherein the lower anchor mounting bracket is connected to a position corresponding to a mount position of the partition body column, and wherein the lower anchor support portion connects a predetermined position of the partition body column positioned above the mount position of the lower anchor mounting bracket and the floor portion of the vehicle body.

19. The vehicle of claim 15, further comprising:

a seat belt retractor mounted on the partition body column; and a protruded retractor mounting portion, wherein the seat belt retractor is mounted to the retractor mounting portion through retractor brackets.

20. The vehicle of claim 15, wherein the partition side assembly comprises:

a partition side frame member that is inclinedly disposed to connect the pole assembly and the floor portion; and a partition side frame panel connecting the pole assembly and the partition side frame member.

* * * * *